United States Patent [19]

LaRoche et al.

[11] Patent Number: 5,031,844
[45] Date of Patent: Jul. 16, 1991

[54] TEARING MACHINE OF LARGE WIDTH FOR THE TEXTILE INDUSTRY

[75] Inventors: Robert LaRoche; Andre Morel, both of Cours-la-Ville, France

[73] Assignee: Constructions Mechaniques F. LaRoche & Fils, France

[21] Appl. No.: 372,377

[22] PCT Filed: Sep. 22, 1988

[86] PCT No.: PCT/FR88/00466
§ 371 Date: Aug. 7, 1989
§ 102(e) Date: Aug. 7, 1989

[87] PCT Pub. No.: WO89/03438
PCT Pub. Date: Apr. 20, 1989

[30] Foreign Application Priority Data
Oct. 6, 1987 [FR] France ............... 87 14150

[51] Int. Cl.$^5$ ............... B02C 19/12
[52] U.S. Cl. ............... 241/62; 241/101.2; 241/101.4; 241/280; 241/152 R
[58] Field of Search ............... 19/80 R, 81, 80 A; 241/101.2, 80, 97, 79.1, 152 R, 101 A, 285 R, 62, 285 A, 277, 280, 101.4

[56] References Cited

U.S. PATENT DOCUMENTS 3,370,628  2/1968  Waldrop ............... 241/101.2 X

FOREIGN PATENT DOCUMENTS

| 2142351 | 1/1985 | |
| 501431 | 10/1925 | Fed. Rep. of Germany . |
| 2400312 | 7/1975 | Fed. Rep. of Germany . |
| 2605328 | 8/1977 | Fed. Rep. of Germany . |
| 492128 | 7/1919 | France . |
| 2283247 | 9/1980 | France . |
| 2018316 | 10/1979 | United Kingdom . |
| 2124264 | 2/1984 | United Kingdom . |

Primary Examiner—Mark Rosenbaum
Attorney, Agent, or Firm—Basile and Hanlon

[57] ABSTRACT

The invention comprises a tearing machine of large width. The feeding station is automatic. A centrifugal separator recycles the scraps recovered by the longitudinal pneumatic transport. It recycles them with the new scraps, in the stack with vibrating walls which extends itself over the entire width of the machine. The compartmentalized suction loading devices assure homogeneity of the fibrous cloth. A fibrous cloth of very high quality is produced on an evacuation conveyor belt. This cloth is homogenous over the entire width of the machine, which may extend to several meters.

13 Claims, 6 Drawing Sheets

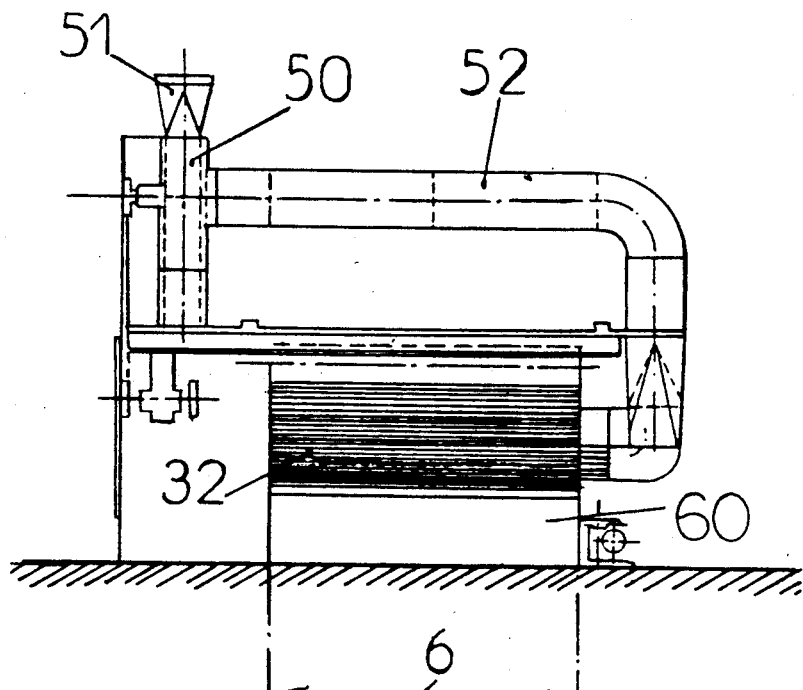
Fig_5
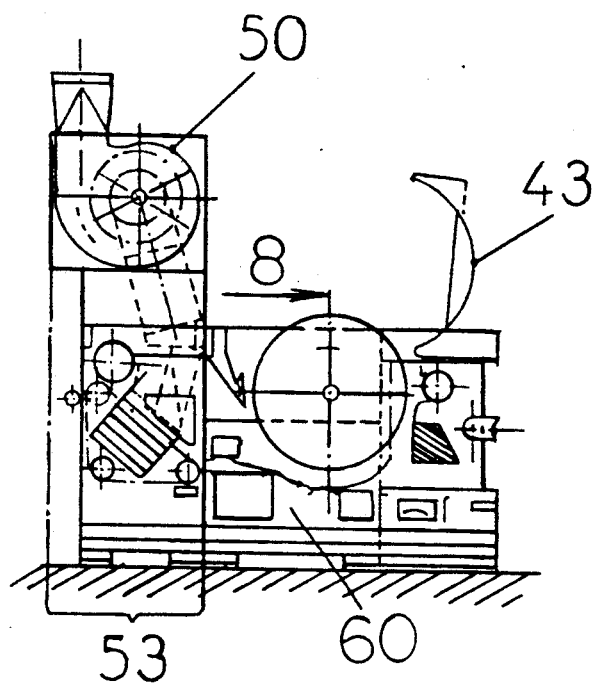
Fig_6

5,031,844

TEARING MACHINE OF LARGE WIDTH FOR THE TEXTILE INDUSTRY

BACKGROUND OF THE INVENTION

1. Field of the Invention

The present invention relates to a tearing machine for use in the textile industry.

2. Description of the Relevant Art

A machine of this type is known, for example, by French Patent 2 283 247. This known machine comprises a feeding station which receives varied textile scraps, and introduces the scraps into a tearing drum with points, which disintegrates the material. The fibers obtained in this way are then evacuated in the form of a fibrous cloth which constitutes a basic pure material, for diverse subsequent fabrications.

Such a known disintegrator presents the distinctive feature of being achieved along a relatively thin width, for example in the order of 80 cm to 140 cm. The feeding is performed manually by an operator who puts the textile scraps on the feeding conveyor belt.

In practice, it would be advantageous to be able to achieve such a tearing along a much larger width (for example on the order of 2 meters). This is impossible to achieve with the known technology cited above. As a matter of fact, for one thing, such a width would be much larger than the breadth of a man in charge of the manual feeding. Additionally, the fibrous cloth obtained at the exit would present, on an equally large width, some significant irregularities, besides irregularities in thickness and density.

The present invention tries to avoid these inconveniences, by providing a tearing machine of large width, for example on the order of 2 meters, and even larger.

SUMMARY OF THE INVENTION

The tearing machine according to the invention comprises a rotary drum with points or teeth extending the entire width of the machine. The feeding of the tearing drum is performed by an automatically functioning station, comprising a vertical stack which receives the scraps to open, and in which these scraps are kept at an approximately constant level, while at least one of the partitions within the vertical stack, between which the scraps go down, comprises a vibrating assembly.

Following another characteristic of the invention, the vibrating wall of the feeding stack extends approximately the entire width of the machine, and accomplishes pulsations whose amplitude and frequency are adjustable.

According to another characteristic of the invention, the transverse and approximately vertical walls of the feeding stack are both achieved with a vibrating method.

According to another characteristic of the invention, at least one of the vibrating walls comprises perforations which make it permeable to the air, which permit recycling the recovered fibrous scraps there more downstream in the machine and forwarded by pneumatic transport.

According to another characteristic of the invention, the pneumatic transport which assures the recycling of the recovered scraps, has a centrifugal separator at the lower part from which are gathered the hard and heavy scraps, while from the upper part, a flux of air moves forward toward the upper part of the feeding stack, the entirety of the usable light fibers.

Following another characteristic of the invention, the machine comprises, downstream from the rotary drum of points, a conveyor strip with multiple perforations. A suction loading device is provided under the conveyor strip and extending the entire width of the cloth. The suction loading device's interior space is divided into several suction compartments divided along the width of the machine. This arrangement assures homogeneity of the fibrous cloth produced over the entire width of the machine, as well as uniformity in thickness and density.

Following another characteristic of the invention, the machine comprises, above the rotary drum with points, a transverse bridge. The length of the bridge can move a sharpening mechanism in both directions. The sharpening mechanism comprises a sharpener with a bushel rotary grindstone, in order to sharpen teeth of the drum over the entire length of the drum.

Following another characteristic of the invention, the machine is made in a modular form, meaning the fibrous cloth flows by successively crossing many modules, each of which comprises a tearing cylinder and its accessories cited above.

Following another characteristic of the invention, the machine in modular form comprises two longitudinal rolling stacks, on which one can displace the sharpening cross-piece. The cross-piece can then be successively brought over each of the rotary drums with points, thereby achieving the sharpening.

BRIEF DESCRIPTION OF THE DRAWINGS

Further advantages and embodiments of the present invention will be understood by reference to the following specification and drawings in which:

FIG. 5 is a view along the direction of arrow V (FIG. 4);

FIG. 6 is a view similar to FIG. 4, after opening the cover which is found at the upper part of the drum with points;

DESCRIPTION OF THE PREFERRED EMBODIMENT

Figure 1:
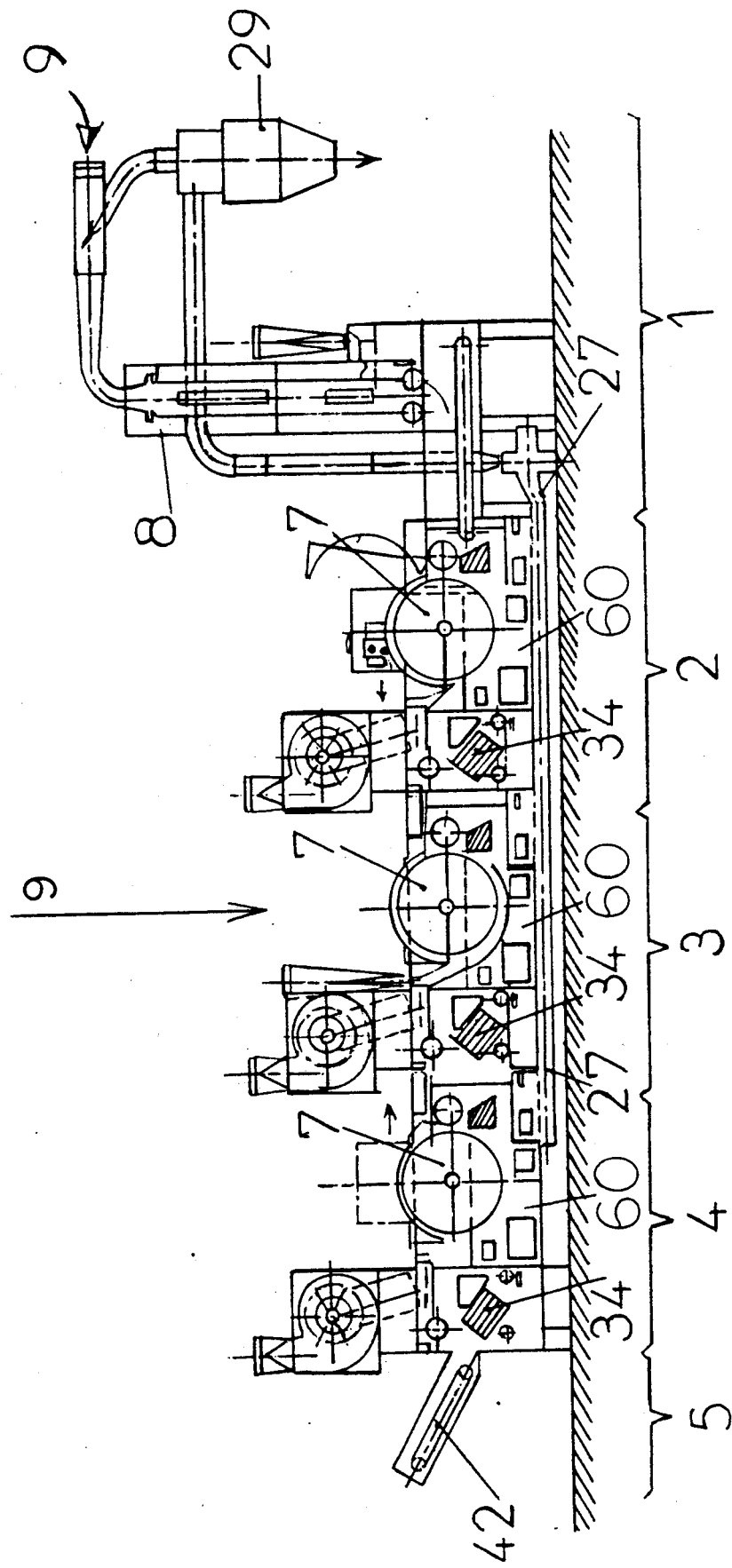
FIG. 1 is a front elevational view of a machine according to the invention, constituted by three successive modules side-by-side.

Referring now to FIG. 1, the machine according to the present invention comprises an automatic feeding station 1, connected to many identical modules 2, 3, 4. At the exit, an evacuation station 5 puts out a fibrous cloth, homogeneous at one and the same time in thickness and in density upon the entire width of the machine.

Figure 2:
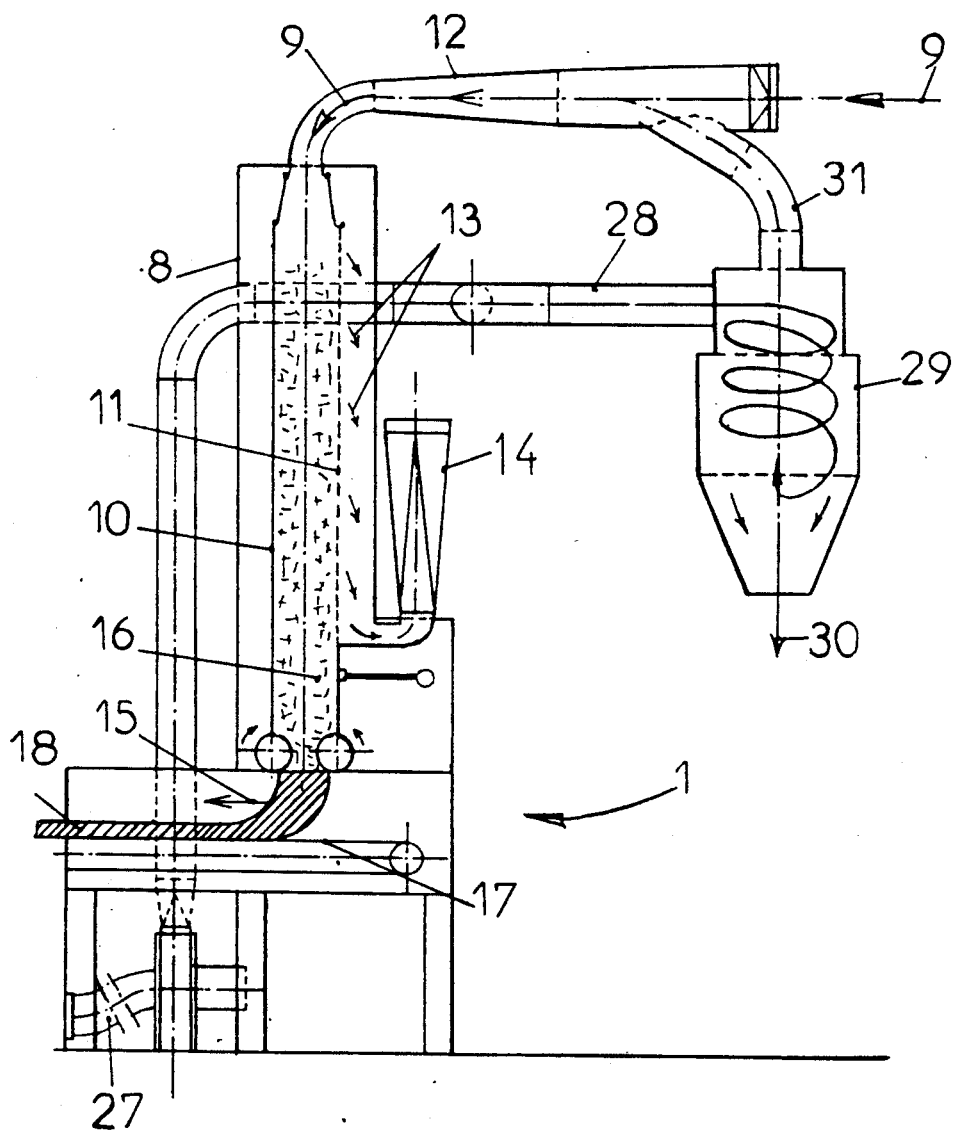
FIG. 2 is an enlarged longitudinal section showing the detail of the feeding station.
Figure 8:
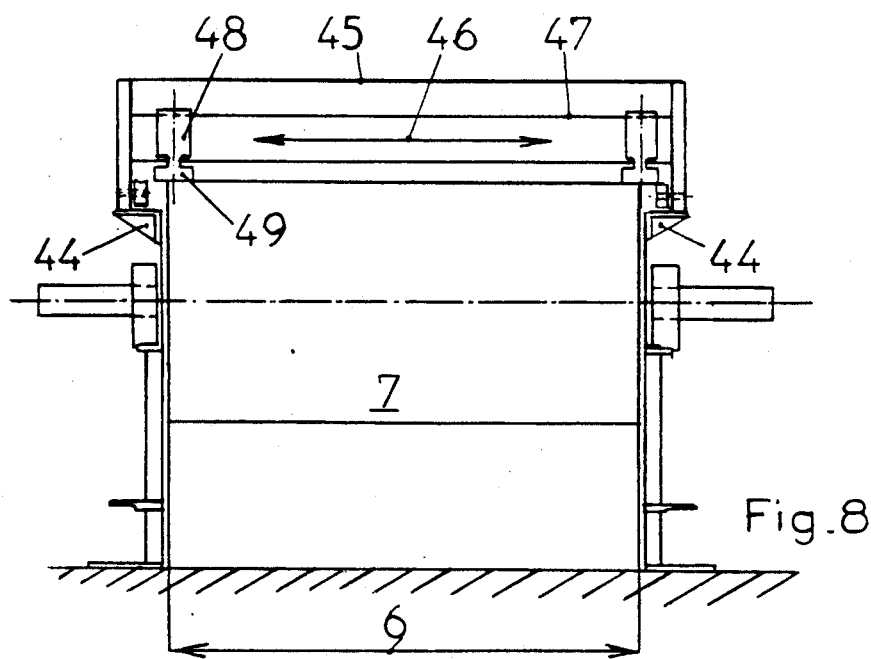
FIG. 8 is a view along the direction of arrow VIII (FIG. 6), when the drum is in position for receiving the sharpening cross-piece.

The usable width 6, as shown in FIG. 5 and 8, is practically equal to the axial length of the tearing drum 7 of each module 2, 3, 4, the tearing drum 7 being disposed within a housing 60. It can be larger, for example equal to several meters. The automatic feeding station 1 comprises a vertical stack 8. The textile scraps for opening are poured through the height of stack 8 (arrow 9 in FIG. 2).

Stack 8 extends itself on the entire width 6 of the housing 60 of the machine. In the interior, stack 8 comprises two approximately vertical partitions or walls 10 and 11, between which pneumatic transport piping 12 pours scraps for opening. At least one of walls 10, 11 vibrates. The vibrating wall 11 is preferably perforated, so that it lets the air from the pneumatic transport 12 (arrows 13) escape, under the suction of an extractor 14. The scraps supplied by the pneumatic transport 31 are received at the bottom of the stack 8 (arrow 15), at the same time as recovered, poured fibers are received along arrow 9.

Figure 3:
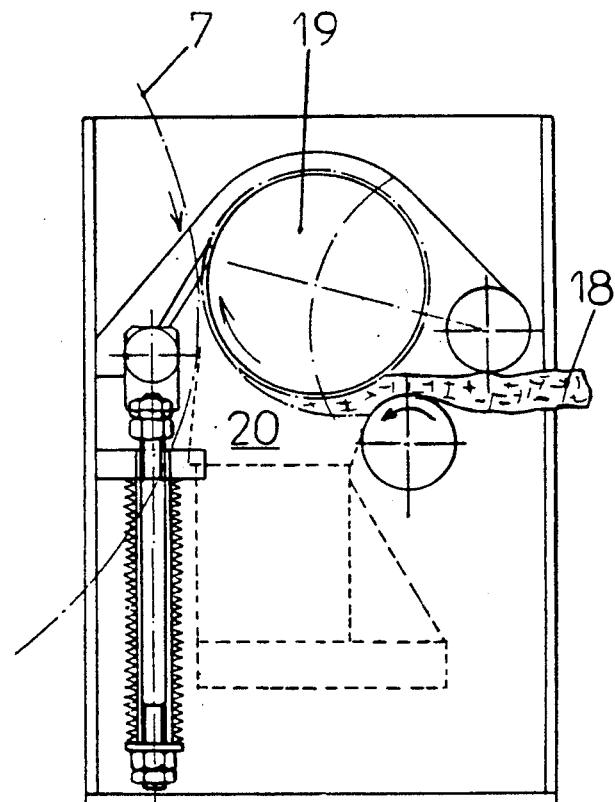
FIG. 3 is a longitudinal section, showing the mechanism which presents the textile scraps to the disintegrator drum.

Due to this arrangement, the fibers and scraps which fall on a feeding conveyor 17 form an approximately uniform cloth on the entire width of the machine. They are forwarded (arrow 15) toward the drum with points or teeth in the first module 2. For that, the cloth 18 in question ends up, in the known manner, between a feeding roller 19, and a reserve trough 20 are shown in FIG. 3. This trough 20 can be formed of a one-piece structure on the entire width of the machine, in a divided form, that is, constituted by placing several pedals or treadles of the same shape side-by-side.

Figure 4:
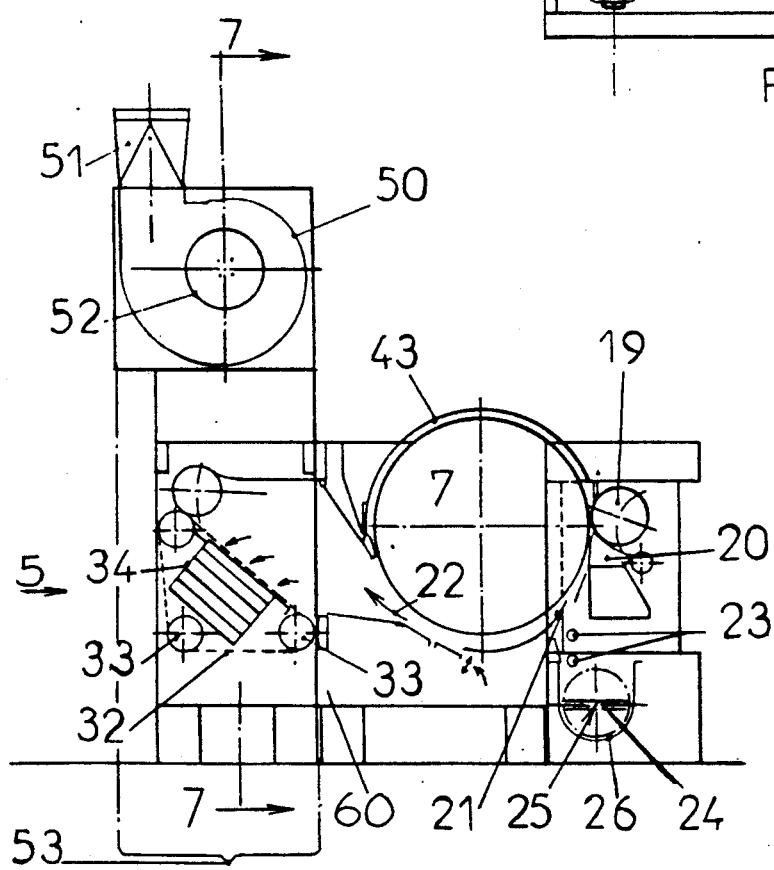
FIG. 4 is a longitudinal section of one of the modules, showing in particular the cloth making device, situated downstream from the disintegrating drum.

After fibers are opened by the points of the rotary drum 7, fixed but adjustable deflecting sheet metal 21 separates the material in two streams as shown in FIG. 4. The first stream consists of light textile fibers adequately open, which flow along the direction indicated by arrow 22. The other stream consists of solid scraps, or scraps insufficiently open 23, which fall on the horizontal valve 24 of a bushel sieve. This valve 24 extends itself over the entire width of the machine, and it turns periodically (for example, every 10 seconds), following a 180° angle, around its transverse horizontal axle 25. A fixed receiving trough 26 is kept permanently below the horizontal valve 24, by a suction returning the solid scraps in a pneumatic transport shaft 27, extending itself under the entire length of the machine (FIG. 1). At its rear part, the shaft 27 is returning toward piping 28, situated at the upper part of the feeding station 1. This piping 28 emerges tangentially in the tank of a centrifugal separator 29. In the lower part of this tank, one recovers (arrow 30), the hard and heavy scraps. On the contrary, at the upper part of separator 29, the reusable fibers are deducted in advance by piping 31 which recycles them toward feed piping 12.

Figure 7:
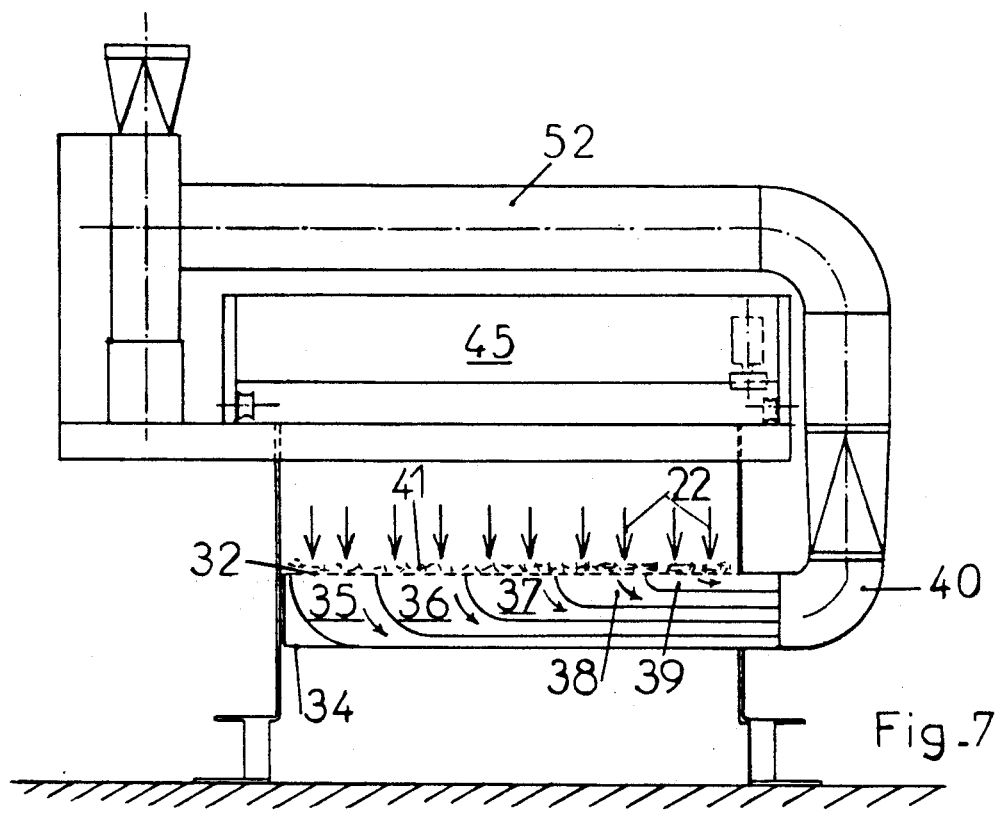
FIG. 7 is a section along line VII—VII in FIG. 4, showing the detail of the compartmentalized suction loading device.

Downstream from each drum 7, fibers 22 fall on a perforated conveyor strip 32 (FIGS. 4 and 5), which circulates continuously on rollers 33. A fixed suction loading device 34 is provided under this conveyor strip 32, extending the entire width of the machine as seen in FIG. 7. The fixed suction loading device 34 is divided into many compartments such as 35, 36, 37, 38, 39, disposed one next to the other over the entire width 6 of the machine. All of these compartments 35, 36, 37, 38, 39 are connected at a common lateral suction 40, which thus keeps the interior space of loading device 34 hollow and, consequently, the spaces in the perforated conveyor strip 32 are kept clear. Due to this disposition, the fibers forwarded along the direction of arrow 22 form, on this conveyor strip 32, a fibrous cloth 41, whose homogeneity stays satisfactorily uniform over the entire width 6 of the machine, as far as the thickness and density are concerned. The cloth 41 is then sent toward the following module, such as 3, 4, until, finally, at the exit from the machine, the evacuation station 5 provides the fibrous cloth on its evacuation conveyor belt 42 (FIG. 1). The fibrous cloth has all the desired quality and a perfect homogeneity on the entire width of the machine, even if this width is equal to several meters.

In each module 2, 3, 4, the drum with points 7 has a raisable cover or lid 43 mounted on it. (FIGS. 4 and 6). When this lid 43 is raised (FIG. 6), while the machine is at rest, one can conduct the sharpening of the points or needles of the corresponding drums 7. To accomplish this sharpening, the invention provides on both sides of the upper part of the machine, two longitudinal rotating stacks 44, on which the extremities of the cross-piece 45 can rotate. The length of this cross-piece, meaning transversely in comparison with the entirety of the machine (double arrow 46 on FIG. 8), can displace itself over a groove 47, and a sharpener 48 of which the lower extremity carries in rotation a millstone 49, of a type in itself known. In this way, when the cross-piece or sharpening bridge 45 is stopped above a drum 7, it is sufficient to displace it alternatively the length of the groove 47, in order to sharpen all the points of the drum 7 situated on the corresponding generator. A rotation of the drum 7 permits in this way sharpening the totality of these points. Due to this arrangement, one sees that a single sharpening bridge 45 allows the sharpening of the points of all the drum 7 of the machine.

Means are provided for selectively regulating both the amplitude and frequency, the movements of wall 11, and eventually of wall 10 of automatic feeding station 1. This assures a good discharge of the majority of the scraps 16, and provides an even density at the lower part of the passage, before the transfer (arrow 15) toward the feeding apparatus of the tearer, opener, disintegrator, or the like.

Figure 9:
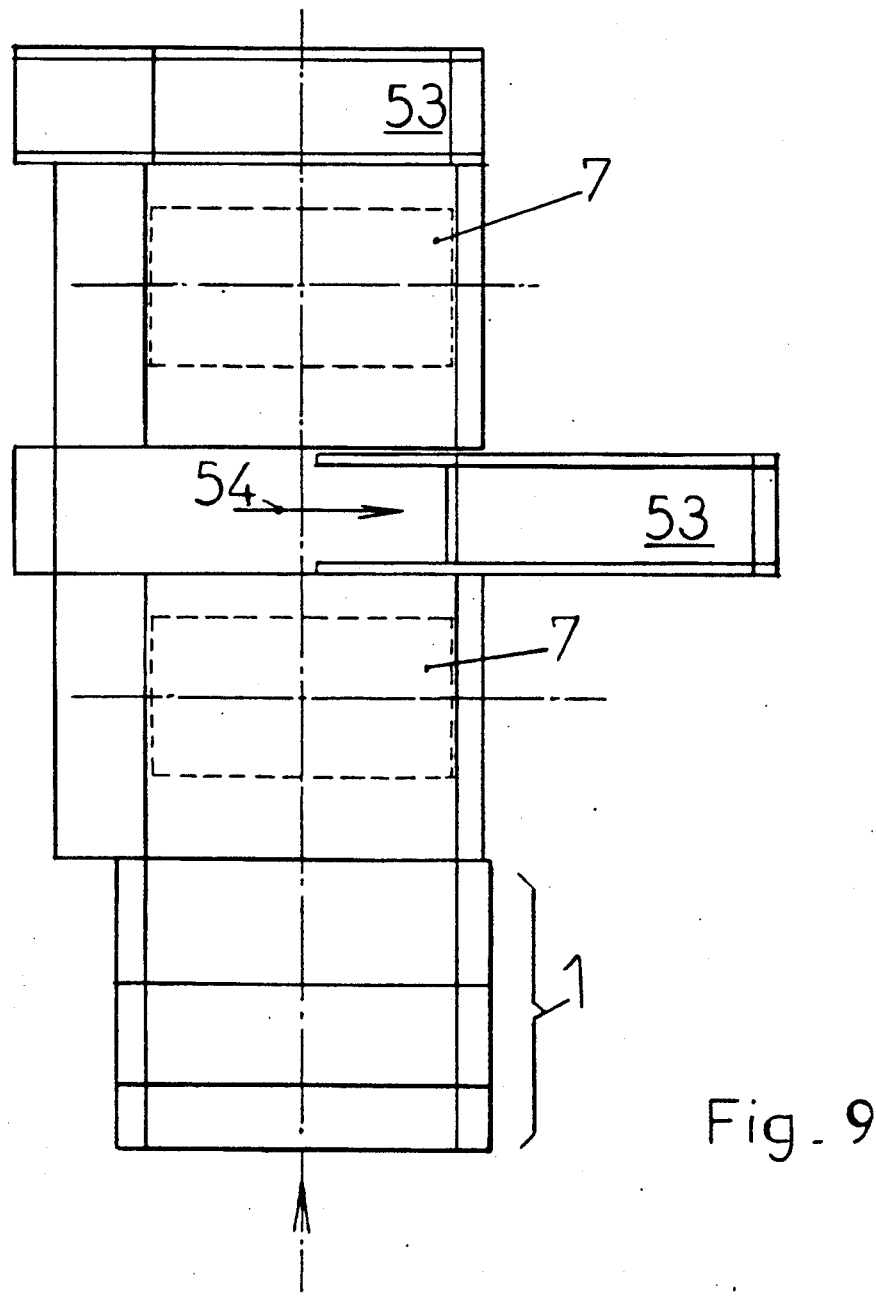
FIG. 9 is a schematic view along the direction of arrow IX (FIG. 1), showing the modular structure of the assembly of the machine.

Referring to FIG. 4, the suction 50 comprises pneumatic piping 51 and 52, formed with the assembly of the loading device 34, the perforated strip 32 and its support parts 33 or drive parts, and a block 53 that one can take out, in the fashion of a drawer, by lateral sliding (see FIG. 9, arrow 54). This considerably facilitates the maintenance operations of the machine.

It is to be understood that the foregoing description is merely exemplary and not limitative, and that the true scope of the invention is that defined in the following claims.

We claim:
1. A tearing machine, comprising:
a rotary tearing drum having teeth, the rotary drum disposed within a housing and extending a width equal to the tearing machine; and
means for automatically feeding the tearing drum with textile scraps, wherein the automatic feeding means comprises:
a vertical scrap receiving stack;
two approximately vertical walls, at least one of which vibrates, disposed within the receiving stack;

a passage formed in the interior of the vertical walls; and pneumatic transport piping in communication with the passage, the passage receiving an approximately constant level of the textile scraps from the piping.

2. The tearing machine as defined in claim 1 wherein the vibrating wall of the scrap receiving stack extends approximately the entire width of the housing, and includes means for selectively regulating the amplitude and frequency of the wall vibrations.

3. The tearing machine as defined in claim 1 wherein the approximately vertical walls of the scrap receiving stack both vibrate.

4. The tearing machine as defined in claim 1 further comprising means for recycling recovered textile scraps downstream in the tearing machine.

5. The tearing machine as defined in claim 4 wherein the recycling means comprises a plurality of perforations formed in at least one of the vibrating walls, the one perforated vibrating wall having air flow through it and into an extractor, the extractor being connected to, and in communication with the scrap receiving stack.

6. The tearing machine as defined in claim 1, further comprising:

centrifugal separating means, in communication with the pneumatic transport piping, for separating hard and heavy scraps downward and reusable light fibers upward and forward toward an upper part of the scrap receiving stack.

7. The tearing machine as defined in claim 1, further comprising:

a conveyor strip having a plurality of perforations, the strip being downstream from the rotary tearing drum;

a suction loading device under the conveyor strip and extending the entire width of the housing; and an interior space defined by the loading device and divided along the width of the housing into several suction compartments.

8. The tearing machine as defined in claim 7, further comprising:

a displaceable transverse bridge disposed above the tearing drum; and means, attached to the bridge, for sharpening the teeth of the drum over the entire length of the drum.

9. The tearing machine as defined in claim 8 wherein the sharpening means comprises a sharpener having a bushel rotary grindstone.

10. The tearing machine as defined in claim 8 wherein the machine is in a modular form, each module comprising the tearing drum, the perforated conveyor strip and the suction loading device, such that a fibrous cloth produced, successively crosses several modules.

11. The tearing machine as defined in claim 10, further comprising means for successively sharpening the tearing drum teeth of each module.

12. The tearing machine as defined in claim 11, wherein the successive sharpening means comprises two longitudinal rolling stacks disposed beneath the sharpening means.

13. The tearing machine as defined in claim 7 further comprising:

means for guiding the perforated conveyor strip;

means for driving the guiding means;

means for suctioning textile scraps; and a laterally sliding block comprising the perforated conveyor strip, the suction loading device, the guiding means, the driving means, and the suctioning means.

* * * * *